(12) United States Patent
Aleskovskiy et al.

(10) Patent No.: US 8,231,853 B2
(45) Date of Patent: Jul. 31, 2012

(54) METHOD FOR PRODUCING OF ULTRA-DISPERSED CARBON

(76) Inventors: Valentin Borisovich Aleskovskiy, St. Petersburg (RU); Elena Valentinovna Pfeifer, legal representative, Weimar (DE); Vladimir Valentinovich Aleskovskiy, legal representative, St. Petersburg (RU); Kirill Borisovich Galitseyskiy, Moscow (RU)

( * ) Notice: Subject to any disclaimer, the term of this patent is extended or adjusted under 35 U.S.C. 154(b) by 624 days.

(21) Appl. No.: 11/914,458

(22) PCT Filed: Apr. 28, 2006

(86) PCT No.: PCT/RU2006/000217
§ 371 (c)(1),
(2), (4) Date: Nov. 15, 2007

(87) PCT Pub. No.: WO2006/126912
PCT Pub. Date: Nov. 30, 2006

(65) Prior Publication Data
US 2009/0226359 A1    Sep. 10, 2009

(30) Foreign Application Priority Data
May 23, 2005    (RU) ................................ 2005115343

(51) Int. Cl.
| C01B 31/02 | (2006.01) |
| C01B 31/00 | (2006.01) |
| C01B 7/01 | (2006.01) |
| C01F 1/00 | (2006.01) |
| C07C 17/00 | (2006.01) |
| H05F 3/00 | (2006.01) |
| B32B 5/16 | (2006.01) |
| B22F 1/02 | (2006.01) |
| B01J 19/08 | (2006.01) |

(52) U.S. Cl. .................... 423/445 R; 423/456; 423/486; 423/170; 204/157.95; 204/165; 428/402; 570/124; 422/186.21

(58) Field of Classification Search ........................ None
See application file for complete search history.

(56) References Cited

U.S. PATENT DOCUMENTS

| 1,891,859 A | * | 12/1932 | Winter ........................... 423/458 |
| 2,843,942 A | * | 7/1958 | Whitsel, Jr. ...................... 34/370 |
| 4,279,880 A | * | 7/1981 | Giet ........................... 423/445 R |
| 5,395,496 A | | 3/1995 | Tsantrizos et al. |
| 5,989,512 A | * | 11/1999 | Lynum et al. .................. 423/456 |

FOREIGN PATENT DOCUMENTS
GB    461497    2/1937
GB    916785    1/1963
* cited by examiner

*Primary Examiner* — Melvin C Mayes
*Assistant Examiner* — Guinever Gregorio
(74) *Attorney, Agent, or Firm* — Bachman & LaPointe, P.C.

(57) ABSTRACT

A method for producing of ultra-dispersed carbon comprises the steps of introducing gaseous methane and chlorine into passageways (3 and 4) of a burner (2) communicating with a chamber (1) of a reactor, combusting the mixture of methane and chlorine resulting in the formation of a diffusion flame, depositing products of a process of oxidative coupling of methane, separating a suspension containing solid carbon particles, and extracting a desired product. The greater part of the methane stream is fed to the outer boundary of the flame through a branch pipe (6) provided within the reactor chamber. Internal walls of the reactor chamber (1) in the combustion zone of the diffusion flame are washed by means of water stream. The desired product is extracted from the crude product through thermal processing of the solid particles suspension. Utilization of the method essentially increases the mono-dispersed carbon yield in the process of oxidative coupling of methane.

7 Claims, 1 Drawing Sheet

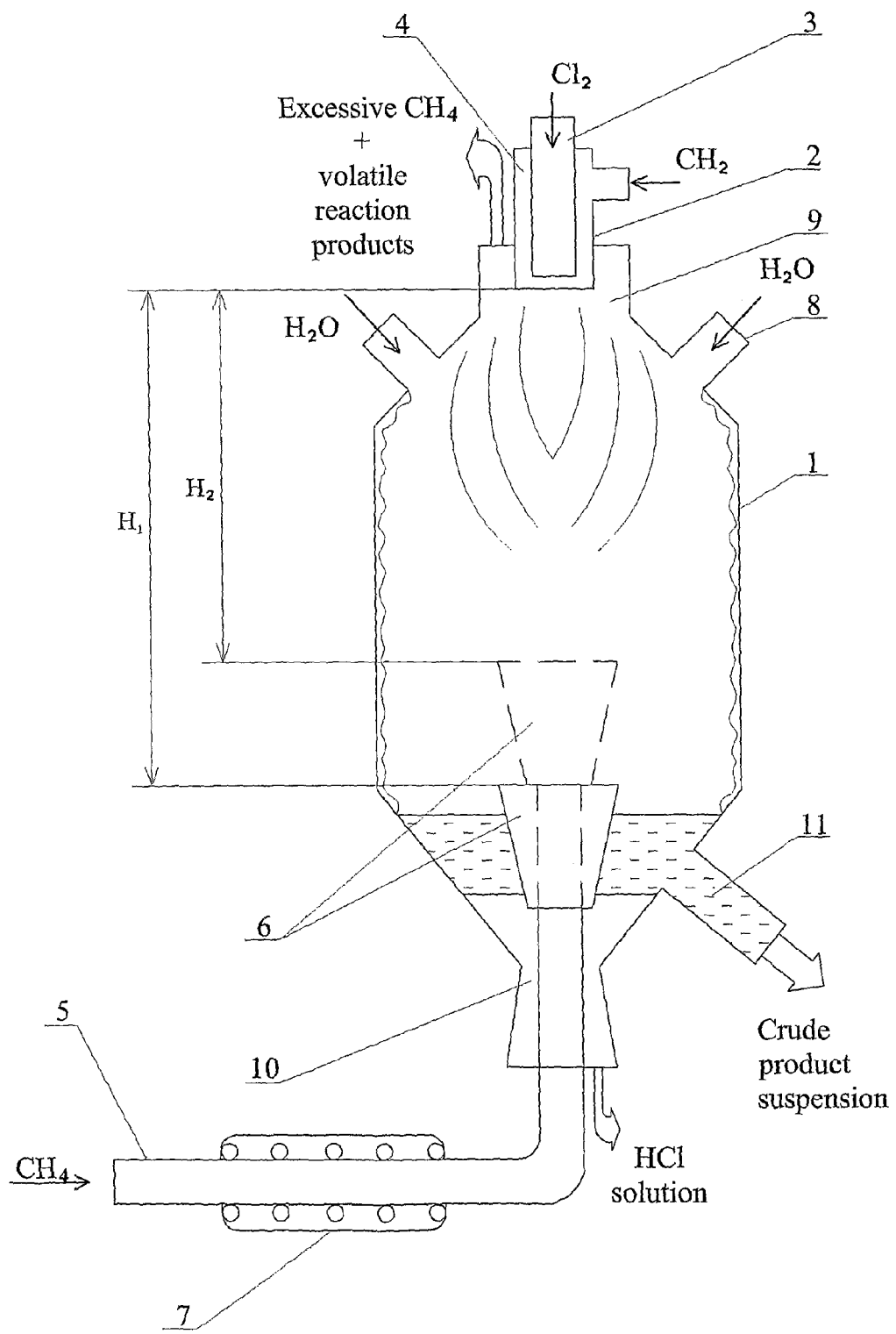

METHOD FOR PRODUCING OF ULTRA-DISPERSED CARBON

FIELD OF THE INVENTION

The invention relates to an organic synthesis process, more particular, to a process for producing ultra-dispersed carbon during processing of hydrocarbons feedstock, in particular of natural gas, and may be used extensively in the petroleum chemical industry.

BACKGROUND OF THE INVENTION

A number of various methods have long been known for producing of ultra-dispersed carbon through processing of a natural gas, in particular, methane. It is a common knowledge that a natural gas includes, depending on the formation, 55-95 wt % of methane, 1-10 wt % of ethane, up to 10 wt % of propane-butane mixture, 1-10 wt % of $C_5$ and higher hydrocarbons, and the balance nitrogen, carbon dioxide, sulfurous compounds, and helium.

There is described in U.S. Pat. No. 5,989,512 (IPC-6 C09C 1/48, published on Nov. 23, 1999) a method for producing of pure ultra-dispersed carbon by providing pyrolytic decomposition of hydrocarbons feedstock in a reaction chamber with the help of a plasma torch. Pyrolysis of methane in the reaction chamber results in the production of carbon and hydrogen.

The plasma torch provides for a predetermined temperature of from 1000° C. to 4000° C. in a reaction zone. Hydrogen is utilized as a process gas. Hydrocarbons are introduced into the reaction zone produced in a central axial part of the reactor chamber by means of injection nozzles provided tangentially in relation to the central axis of the reaction chamber.

The enthalpy value is maintained in the reaction zone at a predetermined level by adjusting the pressure in the reaction chamber within the range of from 1 bar to 3 bar, altering the feed rate of a plasma-forming gas (hydrogen) through the plasma torch and adjusting a angle of nozzles for introduction of hydrocarbons in relation to the central axis of the reaction chamber. It was found that the desirable quality of the produced ultra-dispersed carbon was dependent on the enthalpy value in the reaction zone.

Hydrogen produced during the process may be recirculated as a plasma-forming gas for the plasma torch. The prior art method allows the efficiency of conversion of hydrocarbons feedstock into a desired product—pure hydrogen to be substantially increased. The dispersity of carbon produced during implementation of the method did not, however, exceed 65 $m^2/g$ (with the degree of dispersity being defined as ratio of particles surface area to their weight).

In addition, the carbon particles produced with implementation of the prior art method have high poly-dispersion: the scatter in the values of effective specific surface area of the particles (dispersion) was up to 45%.

Also known is a method for producing of a technical-grade carbon (carbon black) from hydrocarbons feedstock, described in RU Patent No 2129578C1 (IPC-6, C09C 1/48, C090C 1/50, published on Apr. 27, 1999). This prior art method comprises a step of preliminary separation of hydrocarbons feedstock into close-cut fractions with a temperature gradient of from 10° C. to 40° C., which fractions are individually fed into the reaction chamber.

The heated close-out feedstock fractions are mixed into a heated hydrogen-containing gas and supplied to the torches. The mixture is combusted in the torches in the form of a diffusion laminar flame. The technical-grade carbon produced in the flame is deposited on a water-cooled deposition surface. The deposited technical-grade carbon is removed from the surface by means of scrapers and discharged from the apparatus.

Utilization of the close-cut fractions of hydrocarbons feedstock allows carbon to be produced which has an increased effective specific surface area. The given effect is due to the phenomenon of inhibiting the carbon black formation for the mixtures of hydrocarbons. However, with implementation of the method the specific surface area of carbon particles did not exceed 110 $m^2/g$. The scatter in the specific particle surface area values was 13%.

A closest prior art to the claimed invention is a method for producing of carbon during chemical conversion of methane, said method being disclosed in RU Patent No 2172731C1 (IPC-7, C07C 11/02, C07C 2/82, published on Aug. 27, 2001). The method consists in oxidative coupling of methane and other natural gas components in the outer zone of a diffusion flame of a combustible while continuously discharging the chemical conversion products. The combustible and/or oxidizer are preliminarily heated to a temperature of from 500° C. to 1100° C. The process of oxidative coupling of methane is controlled by introducing into the reaction zone of non-combustible catalytically-inactive substances.

Hydrocarbons, in particular methane, are combusted in such a manner that one part thereof is burnt to produce a diffusion flame while the other part runs around the flame boundary to be converted on its outer boundary into desired products. The diffusion flame is generated upon combustion of methane between two streams of an oxidizer, which is preliminarily heated to a temperature exceeding the dissociation temperature for methane.

Combustion of methane is provided when it is available in an amount excessive in relation to an amount of oxidizer required for complete combustion of methane. The prior art method may use chlorine as an oxidizer with a volumetric methane to chlorine ratio of up to 100:1.

The mixed product obtained in the reactor as a result of synthesis and combustion is directed into a heat-exchanger and from there into a separator. The degree of methane conversion is approximately 75%. Unreacted methane is directed from the separator for a repeated conversion process. A dispersed chlorinated carbon is produced among other desired products.

However, implementation of the prior art method which is recognized as ineffective does not allow ultra-dispersed pure carbon to be produced with minimal scatter in the sizes of particles and the effective specific surface area value.

DISCLOSURE OF THE INVENTION

The object of the invention is to produce ultra-dispersed high-purity carbon with an effective specific surface area of from 200 $m^2/g$ to 1100 $m^2/g$ and a scatter in the size of particles no more than 8%. The problem is posed to increase an efficiency of the process of oxidative coupling of methane with regard to the yield of a desired product, i.e., ultra-dispersed carbon.

The technical result achievable upon solving the problems set forth involves an increase in the yield of mono-dispersed carbon in the process of oxidative coupling of methane with an effective specific surface area of carbon particles not less than 200 $m^2/g$.

The achievement of the indicated result is provided by implementation of a method for producing of ultra-dispersed carbon, comprising the steps of introducing gaseous methane and gaseous chlorine into passageways of a burner which is communicating with a reactor chamber, igniting the resulting mixture of methane and chlorine to thereby produce a diffusion flame, depositing products of oxidative coupling of methane, separating a suspension containing solid carbon particles, and extracting a desired product.

According to the present invention, upon ignition of a diffusion flame, the greater part of the methane stream is fed to the outer flame boundary through a branch pipe provided in the reactor chamber, with ratio of the total volumetric feed rate $V_{CH4}$ for methane introduced through the burner and the branch pipe provided in the reactor chamber to the volumetric feed rate $V_{Cl2}$ for chlorine being selected on the condition that $V_{CH4}/V_{Cl2}=1\ldots25$ (from 1 to 25). The internal walls of the reactor chamber adjoining the combustion zone of the diffusion flame are washed by means of water stream, and the temperature of said walls is maintained at the level not higher than 90° C.

The essence of the invention lies in the establishment of the modes of oxidative coupling of methane during conversion thereof in the diffusion flame, at which modes high-purity ultra-dispersed carbon is produced with minimal deviations as to the particle sizes.

As known, a number of factors have an impact on the process of formation of carbon and, correspondingly, on the properties thereof, said factors including a temperature in the reaction zone, reactants feed rates, a feedstock composition, etc (Zuev V. P., Mikhailov V. V., Production of carbon black. Moscow, Chemistry, 1970, pages 24 to 27).

The results of experiments have shown that in the process of oxidative coupling of methane, mono-dispersed carbon with the particle sizes of 20 to 50 nanometer $(20\ldots50\cdot10^{-9}$ m) is produced in the reaction zone adjacent the outer boundary of the diffusion flame produced during combustion of the gaseous mixture of methane and chlorine at a predetermined ratio of volumetric feed rates for methane and chlorine $(V_{CH4}/V_{Cl2}=1\ldots25)$ and a constant temperature in the reaction zone, with water stream flowing along the reaction chamber walls. Furthermore, the greater part of the methane stream should be supplied to the outer boundary of the diffusion flame through the branch pipe provided in the reactor chamber.

The temperature in the reaction zone is adjusted and maintained through selecting the volumetric feed rate ratio for methane and chlorine (within a predetermined range) and changing the reactants feed rates. The temperature of the reactor walls is maintained at the level not in the excess of 90° C. by providing water stream flowing over internal walls of the reaction chamber. The temperature of the reactor chamber walls in the combustion zone of the diffusion flame is preferably maintained within the range of from 40° C. to 70° C.

Under these conditions during the reaction of oxidative coupling of methane, solid nanoparticles of a desired product are formed, said nanoparticles being coated with an enclosure made from the mixture of hexa- and pentachlorobenzenes. As a consequence, the carbon nanoparticles (within the chlorobenzene enclosure) begin to take on the property of hydrophoby, and the ultra-dispersed carbon is carried away from the reaction zone by the water stream washing the reactor walls. The particles of the desired product are easily extracted from the suspension of the product obtained. The desirable properties of carbon are gained upon additional thermal processing of the desired product.

The reaction rate of oxidative coupling of methane and the direction:

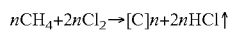

are adjusted through regulation of a value of residual concentration of HCl due to flowing of the water stream along the reactor chamber walls. The HCl solution and the resulting desired product in the form of a suspension with a dispersed phase in the form of solid carbon nanoparticles are taken away from the reactor chamber by the water stream washing the reactor walls.

Spraying of the internal walls of the reactor with water provides for maximally fast removal of HCl from the reaction zone and, consequently, shifting of the process in the direction of formation of condensed desired reaction products. With sufficiently complete removal of HCl, practically the whole of methane introduced into the reactor chamber is involved in the reaction of oxidative coupling of methane.

Utilization of the volumetric feed rate ratio for methane and chlorine within the range of $V_{CH4}/V_{Cl2}=1\ldots25$ enables production of mono-dispersed carbon nanoparticles possessing the property of hydrophoby to allow the desired product to be easily withdrawn and separated.

By varying the feed rates for methane and chlorine within the established values $V_{CH4}/V_{Cl2}$, changing the temperature of internal walls of the reactor chamber and thereby the temperature within the reaction chamber (at the diffusion flame boundary), and also the value of residual concentration of HCl through regulation of the flow rate of the water washing the reactor chamber walls, the conditions of running the reaction of oxidative coupling of methane may be changed and mono-dispersed carbon fraction particles may be produced, said fractions differing in the sizes of desired product (ultra-dispersed carbon). The specific surface area of carbon nanoparticles in the produced fractions essentially exceeds 200 m$^2$/g and reaches up to 1100 m$^2$/g.

With the selected parameters for the predetermined mode of oxidative coupling of methane (at a constant reaction rate and period of keeping of reactants in the reaction zone), equally sized carbon nanoparticles are produced. The composition and properties of the desired product, with other factors being the same, are defined by the period beginning from the formation of combustion products to the "hardening" thereof, the flame temperature and the temperature of the walls of the reactor chamber in the region adjacent to the zone of combustion of the diffusion flame, and also by the extent of shifting the equilibrium of the reaction of oxidative coupling of methane (in the direction of formation of condensed products), said extent of shifting being dependent on the completeness of removal of the byproduct—HCl by means of the water stream.

The carbon particles growth time is dependent on a distance from the outer boundary of the diffusion flame to the relatively cold reaction chamber walls washed with water, in the vicinity of which the particle growth process is interrupted by condensing thereon of chlorine-containing methane conversion products in vapor form.

With other factors being the same, the size of the produced carbon nanoparticles dependent upon the rate of the conversion process may be otherwise regulated by altering the feed rates for the basic components, provided that the predetermined volumetric feed rate ratio for the components is maintained within the range of $V_{CH4}/V_{Cl2}=1\ldots25$.

The process of oxidative coupling of methane may be provided in a vertical-type reactor. In that instance, the greater part of the methane stream is fed to the outer boundary of the flame through a branch pipe provided in the lower part of the reactor chamber. For such a case, a burner is employed which has passageways communicating with the upper part of the reactor chamber.

For feeding the greater part of the methane stream to the outer boundary of the diffusion flame, in a preferable version of embodiment of the method a branch pipe is employed, which is movable in relation to the burner outlet opening for a distance of up to $15L_F$, where $L_F$ is a length of the diffusion flame. Utilization of the movable branch pipe for introducing the methane stream into the reaction chamber enables parameters of the process of oxidative coupling of methane to be optimized by changing the size and contours of the diffusion flame in the reactor chamber through changing the distance between the outlet opening of the burner and the outlet opening of the movable branch pipe which serves as means for distribution of gas in the interior of the reactor chamber.

The solid particles of the product obtained are extracted from the suspension and dried, and the desired product is separated by means of any known method, for example by dry distillation of the product or processing thereof with the use of hydrogen.

It is advantageous to extract the desired product by thermal processing of the solid particle suspension at a temperature of up to 1000° C. Thermal processing of the solid particle suspension is preferably carried out within the temperature range of from 300° C. to 400° C. The resulting product may be otherwise processed by a flow of hydrogen at a temperature of from 200° C. to 400° C. Furthermore, the desired product may be modified by means of other elements and/or alloyed.

BRIEF DESCRIPTION OF DRAWINGS

The invention is further explained by the description of concrete examples of implementation of the method for producing ultra-dispersed carbon and the accompanying drawing (FIG. 1) illustrating a diagram of the reactor employed for implementation of the method.

PREFERABLE EXAMPLES OF EMBODIMENT OF THE INVENTION

The method is implemented with the utilization of a vertical reactor having a chamber 1 manufactured from steel. The internal walls of the chamber 1 are coated with carbon tetrafluoride film or a film consisting of methane chlorination products. The chamber 1 may be also made from graphite reinforced with steel. A burner 2 is provided in the upper part of the reactor chamber 1. The burner 2 includes two coaxial passageways 3 and 4. The central axial passageway 3 is designed for feeding of gaseous chlorine and the annular passageway 4 is adapted for introducing of methane.

The lower part of the chamber 1 is communicating with a pipeline 5 and a movable branch pipe 6, through which pipeline and branch pipe the greater part of the methane stream is introduced after ignition of a diffusion flame by means of the burner 2. The branch pipe 6 includes a widener-distributor and a methane stream reducer (not shown in the drawing). The branch pipe 6 is positioned for moving in relation to an outlet opening of the burner 2 for a distance of from $L_F$ to $4L_F$, where $L_F$ is a length of the diffusion flame ignited by means of the burner. Two positions of the movable branch pipe are shown in the drawing: at a maximal distance $H_1$ from the outlet opening of the burner 2 (the branch pipe is depicted by a full contour line) and at a minimal distance $H_2$ from the outlet opening of the burner 2 (the branch pipe is depicted by a dashed line).

A heater 7 for the methane stream is provided on the pipeline 5. Branch pipes 8 are fixed in the upper part of the chamber 1 and adapted for introducing water therein. The branch pipes 8 are arranged in equally spaced relation along a perimeter of the walls of the chamber 1, around a reaction zone.

In the upper part of the chamber 1 there is provided a throat 9 for discharging gaseous reaction products from the reactor. In the lower part of the chamber 1 there are provided a drain branch pipe 10 and a discharge branch pipe 11 for extracting of a solid carbon particles suspension from the reactor.

The method is implemented with the utilization of a reactor depicted in the drawing as follows.

Gaseous chlorine and methane are introduced, correspondingly, into the passageways 3 and 4 of the burner 2, and the resulting mixture of chlorine and methane is ignited at the outlet opening of the burner 2. As a result, a diffusion flame is generated in the reactor chamber 1. The greater part of the methane stream is thereafter fed through the branch pipe 6 provided in the lower part of the chamber 1 to the outer boundary of the diffusion flame. Methane is supplied to the branch pipe 6 through the pipeline 5. A heater 7, for example an electric heater, is provided on the pipeline 5 upstream of the branch pipe 6 for heating the methane stream to a temperature of from 500° C. to 600° C. prior to introducing thereof into the chamber 1.

By moving the branch pipe 6 in a vertical plane within the range of distances of from $H_1$ to $H_2$ (from the outlet opening of the burner 2), the desirable sizes and contours of the diffusion flame are established. In reactors having a sufficiently high chamber the branch pipe 6 may be moved, depending on the size (length $L_F$) of the diffusion flame, by distances of up to $15L_F$.

In a steady-state mode of burning of the reactant mixture, the diffusion flame is located between the outlets of the passageways 3 and 4 of the burner 2 and the outlet opening of the movable branch pipe 6, at a distance of from 5 mm to 100 mm from the internal walls of the chamber 1.

The total feed rate of the mixture of methane and chlorine is selected within the range of from 0.2 m³/hour to 0.3 m³/hour, with ratio of the volumetric feed rate for methane fed through the passageway 4 of the burner and the branch pipe 6 and the volumetric feed rate for chlorine fed through the passageway 3 of the burner constituting ~4 and ~24 (with two different operating modes of the reactor). The pressure of the gaseous mixture within the reactor chamber 1 is set within the range of from 0.1 MPa to 0.2 MPa.

The temperature near the outer boundary of the diffusion flame, in the vicinity of which boundary a reaction zone of the reactor is disposed, is kept at the level of from 900° C. to 1200° C., said level being provided by adjusting the feed rates of the reactants. The temperature of the walls in the combustion zone of the chamber 1 is maintained within the range of from 20° C. to 70° C. The given temperature mode within the reaction zone of the reactor defines the reaction rate while the feed rates for the reactants, the size and contours of the diffusion flame define the time of keeping the carbon nanoparticles within the reaction zone.

A water stream is supplied through the branch pipes 8 to spray the internal wall of the chamber 1 in the process of oxidative coupling of methane at the outer boundary of the diffusion flame. The water stream washing the wall of the chamber 1 firstly provides for effective cooling of the wall to a desirable temperature level and secondly enables removal of a byproduct—HCl from the reaction zone. This results in shifting of equilibrium of the reaction of oxidative coupling of methane in the direction of formation of condensed reaction products $[C]_n$.

The excessive methane and volatile reaction products are removed from the chamber 1 through the reactor throat 9 and are further passed through a filter (not shown in the drawing). The HCl solution is discharged from the chamber 1 through a funnel, a settling tank and drain branch pipe 10 provided in the lower part of the chamber 1.

During conversion of methane in the process of oxidative coupling of methane in the reaction zone of the diffusion flame of the mixture of chlorine and methane, ultra-dispersed carbon particles (nanoparticles) are produced in a hydrophobic enclosure formed of a hexa- and pentachlorobenzenes mixture. By adjusting the distance H between the outlet openings of the burner 1 and branch pipe 6 and the feed rates for reactants, a desirably contoured and sized flame is created.

In the diffusion flame having an extensive boundary surface area, a crude product of reaction of oxidative coupling of methane is intensively generated. Upon combustion of the reactant mixture in the vicinity of the walls of the chamber 1 continuously washed with water stream, HCl is intensively removed from the reaction zone and thereby the chemical process of oxidative coupling of methane is shifted to the right, in the direction of formation of condensed products. At a constant temperature mode, i.e., at a constant reaction rate and time of keeping the reactants in the reaction zone, 30 . . . 50 nm-sized carbon nanoparticles are formed with a minimal scatter in the particle sizes (±5%). The particle sizes are defined by their growth time in a free state, before the beginning of encapsulation of the particle nuclei by the mixture of high-boiling hexa- and pentachlorobenzenes.

Encapsulation of carbon nanoparticles resulting in the formation of a hydrophobic enclosure takes place in the immediate vicinity of the cold walls of the reactor chamber 1 (the temperature of the walls $T_W=20 \ldots 70°$ C.) in the process of condensing of hexa- and pentachlorobenzenes on the surface of carbon nanoparticles. The availability of the hydrophobic enclosure allows carbon nanoparticles to be separated at a maximal efficiency from other byproducts of reaction by means of water utilized for removal of HCl from the reaction zone.

Encapsulated carbon nanoparticles are deposited on the walls of the chamber 1 and carried away by the water stream which washes the internal walls of the chamber 1. The water stream, in addition, carries away a crude desired product in the form of a suspension including a dispersed phase comprising carbon nanoparticles in the chlorobenzene enclosure. The crude desired product is discharged from the chamber 1 through the discharge branch pipe 11 and directed into a separator (not shown in the drawing), wherein the nanoparticle suspension is separated from the accompanying HCl solution. The suspension is then washed with water and directed for further processing.

The dispersed phase is extracted from the suspension, dried and heated at a temperature of from 300° C. to 400° C. (and up to 1000° C.) for two hours. As a result of thermal processing, the carbon nanoparticles are released from the enclosure containing high-boiling volatile chlorohydrocarbons, and a pure desirable product, i.e., ultra-dispersed carbon is produced.

In order to produce ultra-dispersed carbon modified with hydride functional groups, the desired product is treated with a hydrogen flow at a temperature of from 200° C. to 400° C.

By changing the reaction conditions for oxidative coupling of methane, primarily the feed rates for the reactants, the ratio $V_{CH4}/V_{Cl2}$ of volumetric feed rates within the given range and the residual HCl concentration value, a transition from one to another reaction mode may be provided and a number of fractions of carbon nanoparticles may be produced, said nanoparticles differing by the size and the effective specific surface area. Such controlled variations in the reaction modes result in the production of mono-dispersed carbon homologues with an effective specific surface area essentially exceeding 200 m²/g.

In what follows, concrete examples of embodiment of the method are given, said methods being implemented with the employment of various modes of oxidative coupling of methane in the above reactor.

Example No 1

The ratio $V_{CH4}/V_{Cl2}$ of volumetric feed rates for reactants (the ratio of the total volumetric feed rate $V_{CH4}$ for methane introduced through the burner 2 and the branch pipe 6 to the volumetric feed rate $V_{Cl2}$ for chlorine) was selected to be 4. The temperature $T_W$ of the walls of the chamber 1 in the combustion zone of the diffusion flame was maintained at the level of $T_W=20 \ldots 30°$ C. In the process of reaction of oxidative coupling of methane, a suspension with ultra-dispersed phase of desired product was discharged from the discharge branch pipe 11. The weight of chlorinated ultra-dispersed carbon accounted for 51% (wt %) of the amount of product obtained.

The mixture of chlorobenzenes $C_6Cl_6$ and $C_6HCl_5$ forming a part of composition of the enclosure for chlorinated ultra-dispersed carbon accounted for 32% by weight of particles, the mixture of chloromethanes—11%, chlorides—1.5%.

Heating of the crude desired product for two hours at a temperature of from 300° C. to 350° C. has resulted in sublimation of a crystal product identified as mixture of $C_6Cl_6$ and $C_6HCl_5$. After thermal processing, the crude product had converted into high-purity ultra-dispersed carbon in the form of a highly volatile carbon black powder. Carbon nanoparticles had the specific surface area of about 400 m²/g, the size of particles of 30 nm and an average particle size deviation of ±4%.

It was established after spectrometric tests that vacuum heating of the crude product at a temperature between 60° C. and 150° C. had resulted in the release, for the most part, of chlorobenzenes $C_6Cl_6$ and $C_6HCl_5$, while at a temperature of 300° C. and higher the release of such substances from the product had not been observed. Thus, heating of the crude product at a temperature above 300° C. resulted in the conversion thereof into a pure ultra-dispersed carbon. The pure carbon yield accounted for 29% of the amount of crude product obtained.

Example No 2

The ratio $V_{CH4}/V_{Cl2}$ of volumetric feed rates for the reactants (ratio of the total volumetric feed rate $V_{CH4}$ for methane fed through the burner 2 and the branch pipe 6 to the volumetric feed rate $V_{Cl2}$ for chlorine) was selected to be 24. The temperature $T_W$ of the walls of the chamber 1 in the combustion zone of the diffusion flame was maintained at the level of $T_W=20 \ldots 30°$ C. In the process of reaction of oxidative coupling of methane, a suspension including an ultra-dispersed phase of desired product was extracted from the discharge branch pipe 11. The weight of chlorinated ultra-dispersed carbon accounted for 59% (wt %) of the amount of product obtained. The mixture of chlorobenzenes $C_6Cl_6$ and $C_6HCl_5$ forming a part of composition of the enclosure for chlorinated ultra-dispersed carbon accounted for 30% by weight of particles, the mixture of chloromethanes—10%, chlorides—1.5%.

Heating of the crude desired product for two hours at a temperature of from 300° C. to 350° C. resulted in sublimation of a crystal product identified as mixture of $C_6Cl_6$ and $C_6HCl_5$. After thermal processing, the crude product had converted into high-purity ultra-dispersed carbon in the form of a highly volatile carbon black powder. The specific surface area of carbon nanoparticles approximated 320 m²/g, the size of particles approximated 38 nm and the average particle size deviation made ±4%. The yield of pure carbon accounted for 35% of the amount of crude product obtained.

Example No 3

The mode parameters for the process of oxidative coupling of methane were selected on the basis of the principle of the example No 2. Soluble condensates were withdrawn from the resulted chlorinated carbon by multiple processing with $CCl_4$. It was discovered after investigations with the utilization the ESCA method (Electronic Spectroscopy for Chemical Analysis) that the resultant product was chlorinated ultra-dispersed carbon—$[C]_nCl$.

The resultant product was processed for two hours by means of a hydrogen stream at a temperature of 250° C. After thermal processing, according to data produced by the ESCA method, hydrogenated high-purity ultra-dispersed carbon $[C]_nH$ was produced.

Furthermore, it had been found after experimental tests that with a deviation from the essential conditions of the method: $V_{CH4}/V_{Cl2}=1\ldots 25$ and $T_W \leq 90°$ C., and also with no spraying of walls of the reactor chamber 1 by means of water stream, macroscopic particles rather than discrete carbon nanoparticles are produced in the process of conversion of methane, with the specific surface area of macroscopic particles being slow in increase and making less than 200 m²/g.

The experimental data produced are indicative of an increase in the yield of mono-dispersed carbon in the process of oxidative coupling of methane with the effective specific surface area of carbon particles of at least 200 m²/g and the particle sizes of from 30 nm to 50 nm.

INDUSTRIAL APPLICATION OF THE INVENTION

The method for producing of ultra-dispersed carbon may be widely employed in the technological processes for recovering of crude hydrocarbons in the petroleum chemical industry and in the technological processes for producing of a technical-grade carbon, hydrocarbons and chlorine derivatives thereof.

The above examples of embodiment of the invention are preferable though not exhaustive and do not cover any possible versions of embodiment of the invention based on the claims of the invention, which may be implemented with the use of equipment and processes known to those skilled in the art.

The invention claimed is:

1. A method for producing ultra-dispersed carbon with an effective specific surface area of mono-dispersed carbon nanoparticles of not less than 200 m²/g, comprising the steps of supplying gaseous methane and chlorine into separate passageways of a burner communicating with a reactor chamber, igniting a mixture of methane and chlorine in a combustion zone of the reactor chamber thereby resulting in a formation of a diffusion flame in the combustion zone, depositing products of a process of oxidative coupling of methane, separating a suspension containing solid carbon particles, and extracting a desired product, wherein after ignition of the mixture of methane and chlorine to form the diffusion flame in the combustion zone of the reactor chamber, a further methane stream is fed to an outer boundary of the diffusion flame through a branch pipe provided within the reactor chamber, wherein the ratio of the total volumetric feed rate $V_{CH4}$ for methane supplied through the burner and the branch pipe to the reactor chamber to the volumetric feed rate $V_{Cl2}$ for chlorine is selected on the condition: $V_{CH4}/V_{Cl2}=1$ to 25, and internal walls of the reactor chamber in the combustion zone of the diffusion flame are washed by a water stream such that the internal walls temperature is maintained at the level not higher than 90° C., wherein the desired product consists essentially of an ultra-dispersed carbon with an effective specific surface area of mono-dispersed carbon nanoparticles of not less than 200 m2/g.

2. A method according to the claim 1, wherein the temperature of the internal walls of the reactor chamber, in the combustion zone where the diffusion flame is formed, is maintained within the range of from 20° C. to 70° C.

3. A method according to the claim 1, wherein the amount of the methane stream fed to the outer boundary of the flame through the branch pipe provided within the lower part of the reactor chamber is greater than that fed into the separate passageway, wherein the burner has two passageways which communicate with the upper part of the reactor chamber.

4. A method according to the claim 3, wherein the branch pipe used for feeding the greater part of methane to the outer boundary of the diffusion flame is movable in relation to an outlet opening of the burner for a distance of up to $15L_F$, where $L_F$ is a length of the diffusion flame.

5. A method according to the claim 1, wherein the desired product is extracted through thermal processing of the solid particles suspension at a temperature of up to 1000° C.

6. A method of the claim 5, wherein the desired product is extracted through thermal processing of the solid particles suspension at a temperature between 300° C. and 400° C.

7. A method of the claim 1, wherein the product obtained is processed by means of hydrogen stream at a temperature between 200° C. and 400° C.

* * * * *